March 1, 1966  D. W. WARD  3,237,673
TUBELESS TIRE AND METHOD OF SPLICING THE INSIDE PLIES OF SAME
Filed June 5, 1961  2 Sheets-Sheet 1
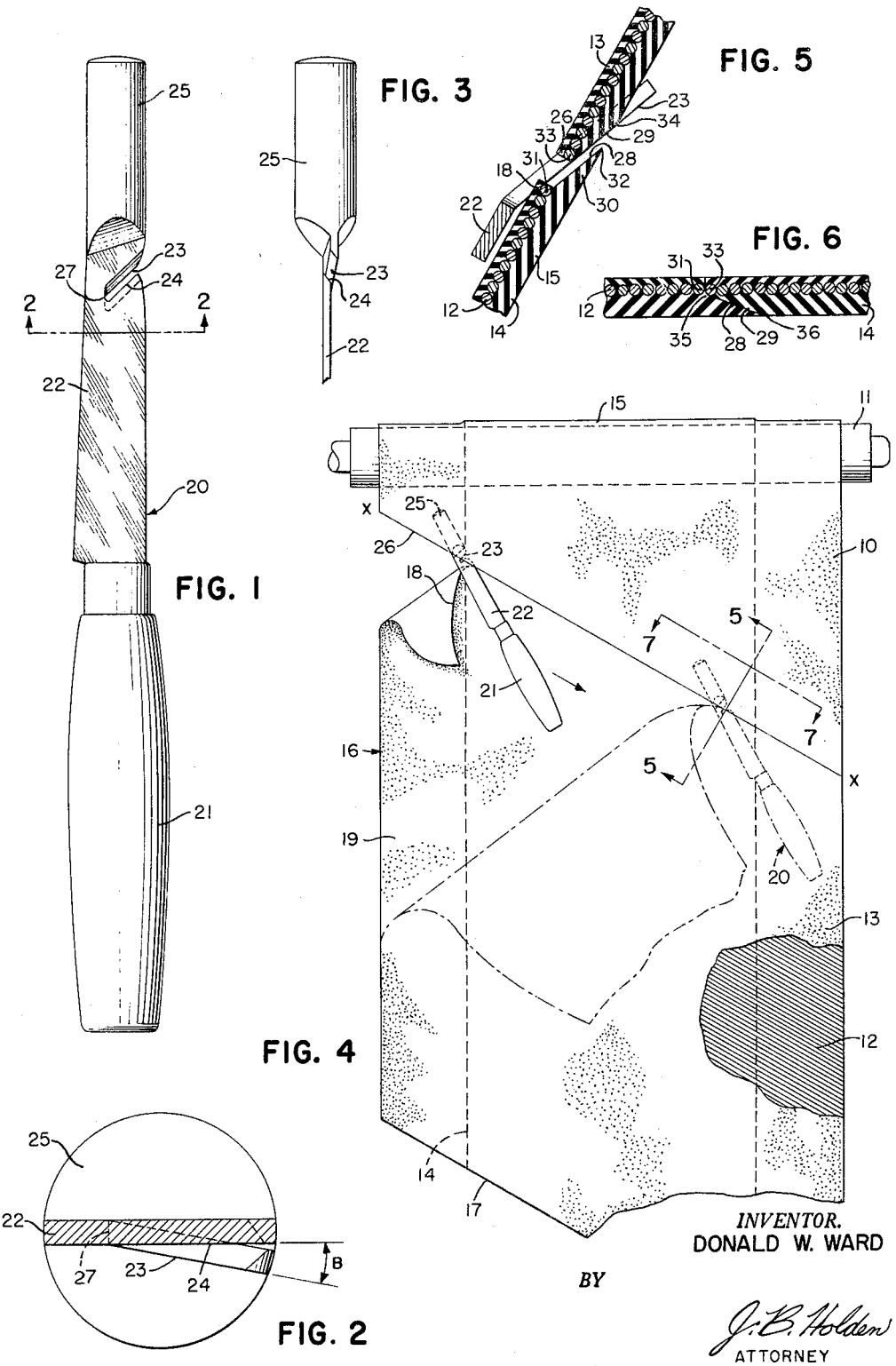
INVENTOR.
DONALD W. WARD
BY
J. B. Holden
ATTORNEY March 1, 1966  D. W. WARD  3,237,673
TUBELESS TIRE AND METHOD OF SPLICING THE INSIDE PLIES OF SAME
Filed June 5, 1961  2 Sheets-Sheet 2

INVENTOR.
DONALD W. WARD
BY
J. B. Holden
ATTORNEY

United States Patent Office 3,237,673
Patented Mar. 1, 1966

3,237,673
TUBELESS TIRE AND METHOD OF SPLICING THE INSIDE PLIES OF SAME
Donald W. Ward, Topeka, Kans., assignor to The Goodyear Tire & Rubber Company, Akron, Ohio, a corporation of Ohio
Filed June 5, 1961, Ser. No. 114,894
4 Claims. (Cl. 152—354)

This invention relates to tubeless pneumatic tires and, more particularly, to a method and apparatus for making a fluid-tight splice in the inner plies of such tires.

In the manufacture of tubeless tires, the inside surface of the tire is provided with a relatively thick layer or liner of rubber-like material, for example, butyl rubber or other elastomer having a high resistance to diffusion of air therethrough. The liner is secured to the inside surface of the first ply. It has been a serious problem in the employment of such liners secured to the first ply of tires to make the necessary splice therein during building of the tire without permitting leakage of air through the splice due to opening of the splice during or curing of the tire. Heretofore, it has been common practice to overlap the first cord ply and/or the liner at the spliced area but this expedient creates a hump across the entire width of the tire at the spliced area, which is highly undesirable since it produces an unbalance in the finished tire. Another expedient has been to butt splice the first cord ply and/or the liner, and provide an overlap of gum rubber across the splice area but this expedient likewise creates a heavy area across the spliced area producing an unbalanced finished tire.

It is an object of this invention to provide a splice of the character described which does not create an unbalance in the tire and which will not open up during shaping of the tire or subsequent to vulcanization.

Another object of the present invention is to provide a splice in the liner and inner cord ply of a tubeless tire which splice embodies a sufficient lap of rubber in the liner to insure that the splice will not open up during shaping and/or curing of the tire, and at the same time not create a heavy spot across the width of the finished tire.

A further object of the present invention is to provide a splice or lap in the liner and inner cord ply of a tubeless tire which is of uniform thickness in cross-section.

A still further object of the present invention is to provide an apparatus for making splices of the character described above.

The above and other objects will be apparent from the following description when made in reference to the following drawings, in which:

FIG. 1 is a plan view of a preferred embodiment of the apparatus of this invention;

FIG. 2 is an enlarged sectional view taken along the lines 2—2 of FIG. 1;

FIG. 3 is a side view with parts broken away of the apparatus shown in FIG. 1;

FIG. 4 is a plan view of a length of tire cord fabric and liner being cut by the apparatus of FIG. 1;

FIG. 5 is a cross-sectional view with parts broken away, taken along the lines 5—5 of FIG. 4;

FIG. 6 is an enlarged sectional view of the spliced area after the first ply has been applied to a tire building drum;

Figure 7:
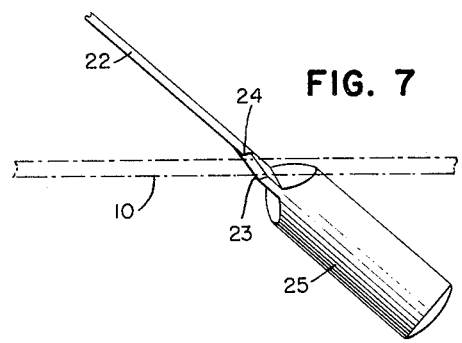
FIG. 7 is an enlarged sectional view with parts broken away, taken along lines 7—7 of FIG. 4.
Figure 8:
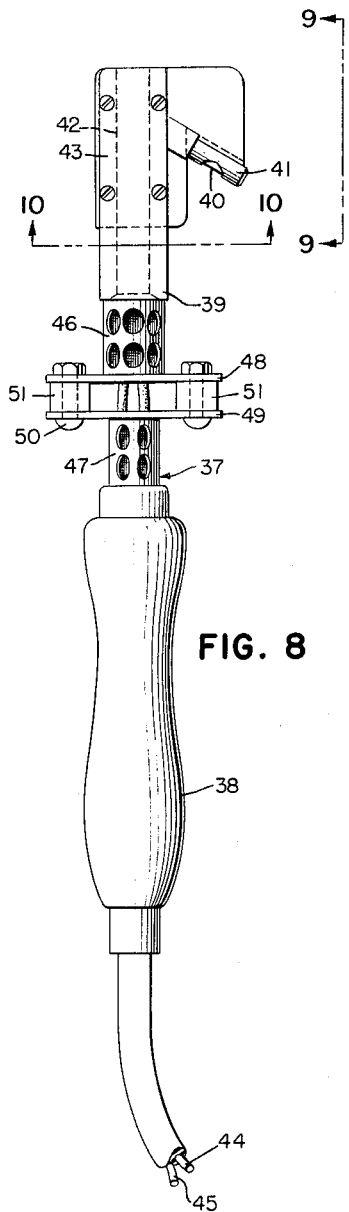
Figures 9, 10:
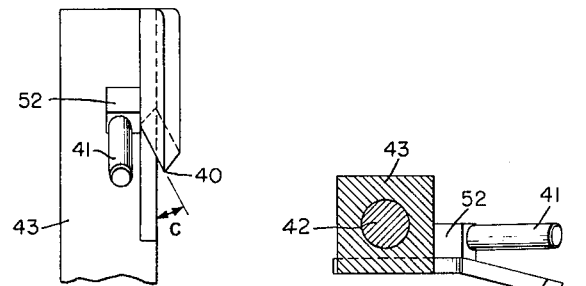
Figure 11:
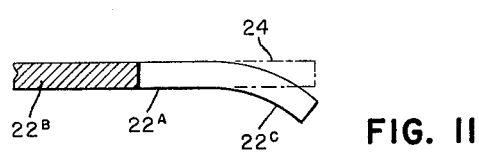
Figure 12:
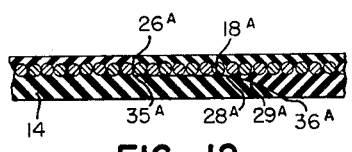

FIGS. 8, 9, and 10 are plan, end, and side views of another modification of the apparatus of this invention;

FIG. 11 is a view similar to FIG. 2 showing a modification of the cutting edge;

FIG. 12 is a view similar to FIG. 6 showing the spliced area of the cord fabric which has been cut by the modification of the apparatus shown in FIG. 11.

Referring to the drawings in detail and particularly to FIG. 4, a length of tire building fabric 10 is shown passing over a roller 11 which is positioned adjacent to a standard tire building machine, not shown. The tire fabric web 10 having a thickness of .03 inch comprises a plurality of parallel cords 12 coated on both sides with a thin skin coat of rubber gum 13. A liner or a thick layer of rubber 14 having a thickness of about .06 inch is disposed across the central portion 15 of the fabric 10 which forms the inner air impervious surface of the finished tire.

The tire builder in making a tubeless tire must cut a ply 16 of fabric from the web 10 and wrap it around a tire building drum so that the liner 14 engages the drum surface. The ends 17 and 18 are then spliced together. In accordance with the usual practice, the tire builder either tears the marginal portion 19 or pulls one of the cords 12 out of the layer of rubber 13 to form a guide line X—X at the required distance from the end 17. The tool 20 is used to cut and skive across the central portion 15 of the ply in a manner to be described more fully below.

Cutting tool 20 is provided with a handle portion 21 and a body 22 having a cutting edge 23, a guide 24, and an enlarged head 25. The head 25 is provided with a cylindrical mass of metal which is heated in a conventional electrical oven prior to use to supply heat to the cutting edge during the cutting operation.

As shown in FIGS. 2 and 3 of the drawings, the cutting edge 23 extends at an angle B relative to the plan of the guide 24 which determines the angle of the skive through the liner 14. Preferably, the angle B is less than 15 degrees. As further shown in FIG. 1 of the drawings, the cutting edge 23 and the guide 24 are parallel to each other in plan view and extend at an acute angle to the longitudinal axis of the body 22.

The tire builder grasps the handle 21 with one hand and holds the edge portion 19 with his other hand. He then inserts the edge 26 of the fabric in between the cutting edge 23 and guide 24 so that the cutting edge extends transversely across the thickness of the liner 14, with the guide 24 engaging the top surface of the ply 10, and the inboard apex surface 27 of the body engaging the edge 26 of the fabric. Preferably, the tool is positioned as shown in FIG. 4 with the cutting edge 23 and guide 24 extending at right angles to the edge 26. While holding the knife in this position, the operator moves the cutting tool along the guide line X—X transversely of the ply 10 and the cutting edge 23 moves through the liner 14 forming coextensive, complementary skive surfaces 28 and 29 therethrough. Apex surface 27 is shorter than the thickness of the liner 14. As the tool is so moved, the ply edge 26 passes under the guide 24 and over the edge 23 while the ply edge 18 passes under both the guide 24 and cutting edge 23.

As shown in FIG. 5 of the drawings, a flap of rubber 30 is formed along the edge 18 with the skived surface 28 extending at an acute angle through the layer of the liner 14. The surface 28 begins immediately adjacent the cord 31 and terminates at 32. The surface 29 formed through liner stock 14 along the edge 26 complements the surface 28 and begins immediately adjacent the cord 33 and terminates at 34 which is located at least several cords removed from the cord 33.

After cutting a ply 16 from the length of material 10 as described above, the tire builder wraps the ply around the tire building drum with the liner 14 engaging the drum and forms a splice as shown in FIG. 6 of the drawings. The surfaces 28 and 29 through the liner 14 are coextensive and parallel and, therefore, form a splice having a length in cross-section substantially greater than the thickness of the liner 14, and the cords 31 and 33 are positioned in the splice area immediately adjacent and parallel to each other with the splice through the liner 14 extending from a point 35 diagonally through the thickness of the liner 14 to a point 36 positioned preferably at least several cords away from the cords 31 and 33. The splice thus formed is exceptionally strong, insuring that the splice will not open up during shaping or curving of the tire, and at the same time does not create a heavy spot across the width of the cured tire.

FIGS. 9 through 11 of the drawings show a modification of the apparatus of this invention which cuts ply stock 10 similar to that shown in FIG. 4 of the drawings to form complementary skive edges 17 and 18 to form a splice as shown in FIG. 6 of the drawings. The modified apparatus differs in several respects from the apparatus shown in FIGS. 1 through 4 of the drawings, as will be more fully explained hereinafter.

The modified tool 37 is provided with a handle portion 38, and a body 39, having a cutting edge 40, a guide 41, and a resistant heater 42 in the head 43. Wires 44 and 45 extend through handle 38 and the body 39 to supply electrical energy to the resistant heater 42. The head 43 is connected to the handle 38 by means of heat dissipating perforated metal cylinders 46 and 47, each having secured thereto a plate 48 and 49 suitably secured together by bolts 50 and insulated from each other by cylindrical insulators 51. As shown in FIG. 8, the guide 41 and cutting edge 40 extend parallel to each other at an acute angle relative to the longitudinal axis of the body 39 and as shown in FIG. 9, the cutting edge 40 extends at a small included angle C, preferably less than 15 degrees relative to the upper surface of the head 43.

The tire builder, in a manner similar to that described with respect to the tool 20 shown in FIGS. 1 through 4, grasps the handle 38 with one hand and holds edge portion 19 with one hand. He then inserts the edge 26 of the fabric in between the cutting edge 40 and the guide 41 of the tool 37 so that the cutting edge extends transversely across the thickness of the liner 14, with the guide 41 engaging the top surface of the ply 10, and with the surface 52 of the body engaging the edge 26 of the fabric. The tool is positioned with the longitudinal axis of the head 43 parallel to the cords 12. While holding the knife in this position, the operator moves the knife along the guide line X—X transversely of the ply 10 and the cutting edge moves through the liner 14 to form a coextensive, complementary, skive edge 28 and 29 therethrough, as shown in FIG. 6. During the cutting operation, the edge 26 passes under the guide 41 and over the cutting edge 40, whereas the ply edge 18 passes under the guide 41 and under the cutting edge 40.

Not only is the tool 37 provided with its own resistant heater 42 so that the cutting edge is continuously heated to the proper temperature during the cutting operation, but the angularity of the cutting edge 40 and guide 41 relative to the longitudinal axis of the tool 37 is opposite to that of the angularity of the cutting edge 23 and guide 24 of the tool 20 shown in FIGS. 1 through 4 so that the tool 37 may be moved during the cutting operation in a direction parallel to the longitudinal axis thereof.

A further modification of the invention is shown in FIG. 11 of the drawings in which the tool is identical to that shown in FIG. 1 except that the cutting edge 22a instead of extending at an acute angle B, as shown in FIG. 2 of the drawings, extends in a curvilinear direction with the inboard portion 22b extending parallel to the guide edge 24 and the outboard portion 22c extending in a curved direction away from the guide edge 23. The curvilinear cutting edge 22a shown in FIG. 11 of the drawings makes a cut through the liner 14, as shown in FIG. 12 of the drawings in which the splice area extends from the point 35a parallel to the surfaces of the cord fabric for a distance of at least several cords and then curves through the thickness of the liner 14 to a point 36a so that the curvilinear surface 29a formed through the liner stock 14 along the edge 26a is coextensive with and complements the curvilinear surface 28a formed along the edge 18a. It is thus seen that the splice or seam shown in FIG. 12 of the drawings through the liner stock 14 has a length in cross-section several times greater than the overall thickness of the cord fabric and substantially longer in cross-section than the cross-sectional length of the splice shown in FIG. 6 of the drawings.

While certain representative embodiments and details have been shown for the purpose of illustrating the invention, it will be apparent to those skilled in this art that various changes and modifications may be made therein without departing from the spirit or scope of the invention.

What is claimed is:

1. A method of splicing the inside plies of tubeless pneumatic cord fabric tires to provide a splice in the finished tire which will not open up during shaping and curing of the tire and does not form a high spot in the tire comprising, forming a web of parallel cords coated with rubber in which the cords extend transversely of the web, said web also having a thick liner of rubber applied to one side thereof, cutting a ply of proper length from said web for use as the inside ply of a tubeless tire by cutting perpendicularly through the web parallel to the cords and also simultaneously cutting through the liner at an angle with respect to the perpendicular cut to form coextensive complementary surfaces which have a dimension at right angles to the cut edges thereof greater than the thickness of said liner, splicing the said cut ply ends together to form the first ply of the tire with the said coextensive complementary surfaces in overlying and abutting relationship whereby the thickness of said splice is no greater than the thickness of said web plus liner.

2. A method of splicing the inside plies of tubeless pneumatic cord fabric tires to provide a splice in the finished tire which will not open up during shaping and curing of the tire and does not form a high spot in the tire comprising, forming a web of transverse, parallel cords having a thin coating of rubber applied to one side and a thick liner of rubber applied to the other side thereof, removing at least one cord remote from the end of said web by pulling it from said thin coating of rubber, cutting said thick rubber liner parallel to said cords along the line formed by the removal of said cord and in section through the thickness thereof to form a ply having coextensive, complementary end surfaces which have a dimension at right angles to the cut edges thereof greater than the thickness of said liner, splicing the complementary ends of said ply together to form the first ply of a tubeless tire with the said coextensive complementary surfaces of said ply in overlying and abutting relationship whereby the thickness of said splice is no greater than the thickness of said web plus liner.

3. In a tubeless tire, a first ply of rubber-coated tire cord fabric having parallel cords extending across the width of the tire which are coated on one side with a thicker rubber coating than on the other side thereof, said thicker rubber forming the liner of the tire, a splice in said first ply extending across the width of said tire, the cords at said splice lying parallel and adjacent to each other in the same plane, said splice extending longitudinally parallel to said cords and in cross-section between said adjacent cords and through said thicker rubber coating at right angles to the longitudinal direction of said cords, said splice extending in cross-section through said thicker rubber coating for a distance substantially greater than the thickness of said coating and formed in cross-section by complementary coextensive surfaces which terminate at a point several cords removed from said adjacent cords so that the thickness of said splice is no greater than the overall thickness of said ply.

4. A tubeless tire having a first ply lap splice as claimed in claim 3 in which said splice through said thicker rubber coating extends in cross-section in a curvilinear direction.

References Cited by the Examiner

UNITED STATES PATENTS

| | | | |
|---|---|---|---|
| 1,043,143 | 11/1912 | Raymond | 154—52 |
| 1,160,754 | 11/1915 | Poore | 30—140 |
| 1,467,289 | 9/1923 | Eames | 156—258 |
| 1,658,884 | 2/1928 | Cusick | 30—140 |
| 1,734,023 | 10/1929 | Smith | 156—126 |
| 1,899,067 | 2/1933 | Trumbull | 156—258 |
| 1,905,365 | 4/1933 | Carlin | 156—258 |
| 2,311,766 | 2/1943 | Lumbard | 156—258 |
| 2,332,987 | 10/1943 | Carlin | 156—266 |
| 2,468,304 | 4/1949 | Musselman | 154—52 |
| 2,688,996 | 9/1954 | Loomis | 156—134 |
| 2,739,095 | 3/1956 | Stone | 156—258 |
| 2,754,887 | 7/1956 | Wykoff | 156—134 |
| 2,764,220 | 9/1956 | Anderson | 156—258 |
| 3,028,902 | 4/1962 | Formanek | 156—123 |

ALEXANDER WYMAN, *Primary Examiner.*

CARL F. KRAFFT, HAROLD ANSHER, EARL M. BERGERT, *Examiners.*